United States Patent
Kamio (10) Patent No.: US 11,349,429 B2
(45) Date of Patent: May 31, 2022

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

(\*) Notice: Subject to any disclaimer, the term of this patent is extended or adjusted under 35 U.S.C. 154(b) by 0 days.

(21) Appl. No.: 17/016,752

(22) Filed: Sep. 10, 2020

(65) Prior Publication Data

US 2020/0412293 A1  Dec. 31, 2020

Related U.S. Application Data

(63) Continuation of application No. PCT/JP2019/009655, filed on Mar. 11, 2019.

(30) Foreign Application Priority Data

Mar. 13, 2018  (JP) .............................. JP2018-045398

(51) Int. Cl.
 *H02P 29/028* (2016.01)
 *H02P 6/28* (2016.01)
 (Continued)

(52) U.S. Cl.
 CPC ............ *H02P 29/028* (2013.01); *F16H 61/12* (2013.01); *F16H 61/32* (2013.01); *H02P 6/16* (2013.01);
 (Continued)

(58) Field of Classification Search
 CPC .. H02P 29/028; H02P 6/28; H02P 6/16; H02P 25/22; F16H 61/12; F16H 61/32;
 (Continued)

(56) References Cited

U.S. PATENT DOCUMENTS 6,252,367 B1 \* 6/2001 Sakamoto .............. G05B 19/39
 318/560
7,717,006 B2 \* 5/2010 Kimura ................... F16H 61/32
 74/335
(Continued)

FOREIGN PATENT DOCUMENTS

JP  9-288189  11/1997
JP  2002-349704  12/2002
(Continued)

OTHER PUBLICATIONS

U.S. Appl. No. 17/016,752, filed Sep. 10, 2020, Shift Range Control Device.
(Continued)

*Primary Examiner* — Muhammad S Islam
*Assistant Examiner* — Devon A Joseph
(74) *Attorney, Agent, or Firm* — Nixon & Vanderhye P.C.

(57) ABSTRACT

A shift range control device is provided for a shift range switching system that includes a motor and a plurality of detectors. The motor has a plurality of winding sets. Each of the detectors is configured to detect a physical quantity that changes in accordance with rotation of the motor. The shift range control device includes a plurality of controllers configured to control switching of a shift range by controlling drive of the motor. Each of the controllers is provided to corresponding one of the winding sets and configured to acquire detection signals from the detectors, determine, based on the detection signals, a calculation signal having a same value between the controllers, and control, based on a target shift range and the calculation signal, a current supply to the corresponding one of the winding sets.

3 Claims, 7 Drawing Sheets

(51) Int. Cl.
  *F16H 61/12* (2010.01)
  *F16H 61/32* (2006.01)
  *H02P 6/16* (2016.01)
  *H02P 25/22* (2006.01)
(52) U.S. Cl.
  CPC ............... *H02P 6/28* (2016.02); *H02P 25/22* (2013.01); *F16H 2061/1268* (2013.01); *F16H 2061/326* (2013.01)
(58) Field of Classification Search
  CPC ....... F16H 2061/1268; F16H 2061/326; F16H 2061/1212
  See application file for complete search history.

(56) References Cited

U.S. PATENT DOCUMENTS

| 9,862,406 | B2* | 1/2018 | Toda | B62D 5/0487 |
| 10,185,315 | B2* | 1/2019 | Naoi | H02P 6/04 |
| 2004/0128042 | A1* | 7/2004 | Takahashi | B62D 5/0403 |
| | | | | 701/41 |
| 2005/0174084 | A1 | 8/2005 | Nakai et al. | |
| 2006/0261760 | A1* | 11/2006 | Shinojima | H02K 7/116 |
| | | | | 318/34 |
| 2011/0266984 | A1* | 11/2011 | Watanabe | H02P 29/032 |
| | | | | 318/400.21 |
| 2019/0152524 | A1* | 5/2019 | Fujita | B62D 5/046 |
| 2019/0195354 | A1 | 6/2019 | Kamio | |

FOREIGN PATENT DOCUMENTS

| JP | 2003-97694 | 4/2003 |
| WO | 2019/181886 | 9/2019 |

OTHER PUBLICATIONS

U.S. Appl. No. 17/027,435, filed Sep. 21, 2020, Shift Range Control Device.

U.S. Appl. No. 17/027,435, to Kamio et al,, "Shift Range Control Device", filed Sep. 21, 2020 (24 pages).

* cited by examiner

| SIGNAL PATTERN | | | | |
|---|---|---|---|---|
| NUMBER | A-PHASE | B-PHASE | C-PHASE | STATUS |
| (0) | 0(Lo) | 0(Lo) | 1(Hi) | NORMAL |
| (1) | 0(Lo) | 1(Hi) | 1(Hi) | NORMAL |
| (2) | 0(Lo) | 1(Hi) | 0(Lo) | NORMAL |
| (3) | 1(Hi) | 1(Hi) | 0(Lo) | NORMAL |
| (4) | 1(Hi) | 0(Lo) | 0(Lo) | NORMAL |
| (5) | 1(Hi) | 0(Lo) | 1(Hi) | NORMAL |
| (6) | 1(Hi) | 1(Hi) | 1(Hi) | FAULT |
| (7) | 0(Lo) | 0(Lo) | 0(Lo) | FAULT |

SHIFT RANGE CONTROL DEVICE

CROSS REFERENCE TO RELATED APPLICATIONS

The present application is a continuation application of International Patent Application No. PCT/JP2019/009655 filed on Mar. 11, 2019, which designated the U.S. and claims the benefit of priority from Japanese Patent Application No. 2018-045398 filed on Mar. 13, 2018. The entire disclosures of all of the above applications are incorporated herein by reference.

TECHNICAL FIELD

The present disclosure relates to a shift range control device.

BACKGROUND

There has been known a shift range switching apparatus that switches a shift range by controlling a motor.

SUMMARY

The present disclosure provides a shift range control device for a shift range switching system that includes a motor and a plurality of detectors. The motor has a plurality of winding sets. Each of the detectors is configured to detect a physical quantity that changes in accordance with rotation of the motor. The shift range control device includes a plurality of controllers configured to control switching of a shift range by controlling drive of the motor. Each of the controllers is provided to corresponding one of the winding sets and configured to acquire detection signals from the detectors, determine, based on the detection signals, a calculation signal having a same value between the controllers, and control, based on a target shift range and the calculation signal, a current supply to the corresponding one of the winding sets.

BRIEF DESCRIPTION OF DRAWINGS

Objects, features and advantages of the present disclosure will become apparent from the following detailed description made with reference to the accompanying drawings. In the drawings.

DETAILED DESCRIPTION

In a shift range switching system, a value of an output shaft sensor may be used for calculating a target motor rotational angle. In a case where the shift range switching system includes one each of electronic controller (ECU), encoder, and output shaft sensor, when a fault occurs in the ECU, the encoder, or the output shaft sensor, there is a possibility that the motor cannot be driven and the switching of the shift range cannot be continued. It is conceivable to employ a double system design in order to ensure evacuation traveling performance at an occurrence of a fault. For example, when a sensor for detecting a value to be used in a motor drive control, such as an output shaft sensor, is duplexed, control inconsistency due to a sensor error might occur.

A shift range control device according to an aspect of the present disclosure is provided for a shift range switching system that includes a motor and a plurality of detectors. The motor has a plurality of winding sets. Each of the detectors is configured to detect a physical quantity that changes in accordance with rotation of the motor. The shift range control device includes a plurality of controllers configured to control switching of a shift range by controlling drive of the motor. Each of the controllers is provided to corresponding one of the winding sets. Each of the controllers includes a signal processor and a drive controller. The signal processor is configured to acquire detection signals from the detectors and determine, based on the detection signals, a calculation signal having a same value between the controllers. The drive controller is configured to control, based on a target shift range and the calculation signal, a current supply to the corresponding one of the winding sets.

A shift range control device according to another aspect of the present disclosure is provided for a shift range switching system that includes a motor and a plurality of detectors. The motor has a plurality of winding sets. Each of the detectors is configured to detect a physical quantity that changes in accordance with rotation of the motor. The shift range control device includes a plurality of controllers configured to control switching of a shift range by controlling drive of the motor. Each of the controllers is provided to corresponding one of the winding sets. Each of the controllers includes a processor and a memory. The memory stores instructions configured to, when executed by the processor, cause the processor to acquire detection signals from the detectors, determine, based on the detection signals, a calculation signal having a same value between the controllers, and control, based on a target shift range and the calculation signal, a current supply to the corresponding one of the winding sets.

Since the configuration related to the motor drive control is multiplexed in the above-described aspects, even when a fault has occurred partially, the motor drive control can be continued and the shift range can be switched. Therefore, it is possible to ensure evacuation traveling performance. Further, since the calculation signals having the same value between all the controllers are used for current-supply control, it is possible to avoid control inconsistency due to errors in the detection signals. Therefore, deterioration in controllability due to control inconsistency can be prevented, and control loss can be reduced, so that the motor can be driven with high efficiency.

One Embodiment

Hereinafter, a shift range control device according to the present disclosure will be described with reference to the drawings. As shown in FIGS. 1 to 4, a shift-by-wire system 1 as a shift range switching system includes a motor 10 as an actuator, a shift range switching mechanism 20, a parking lock mechanism 30, a shift range control device 40, and the like.

Figure 3:
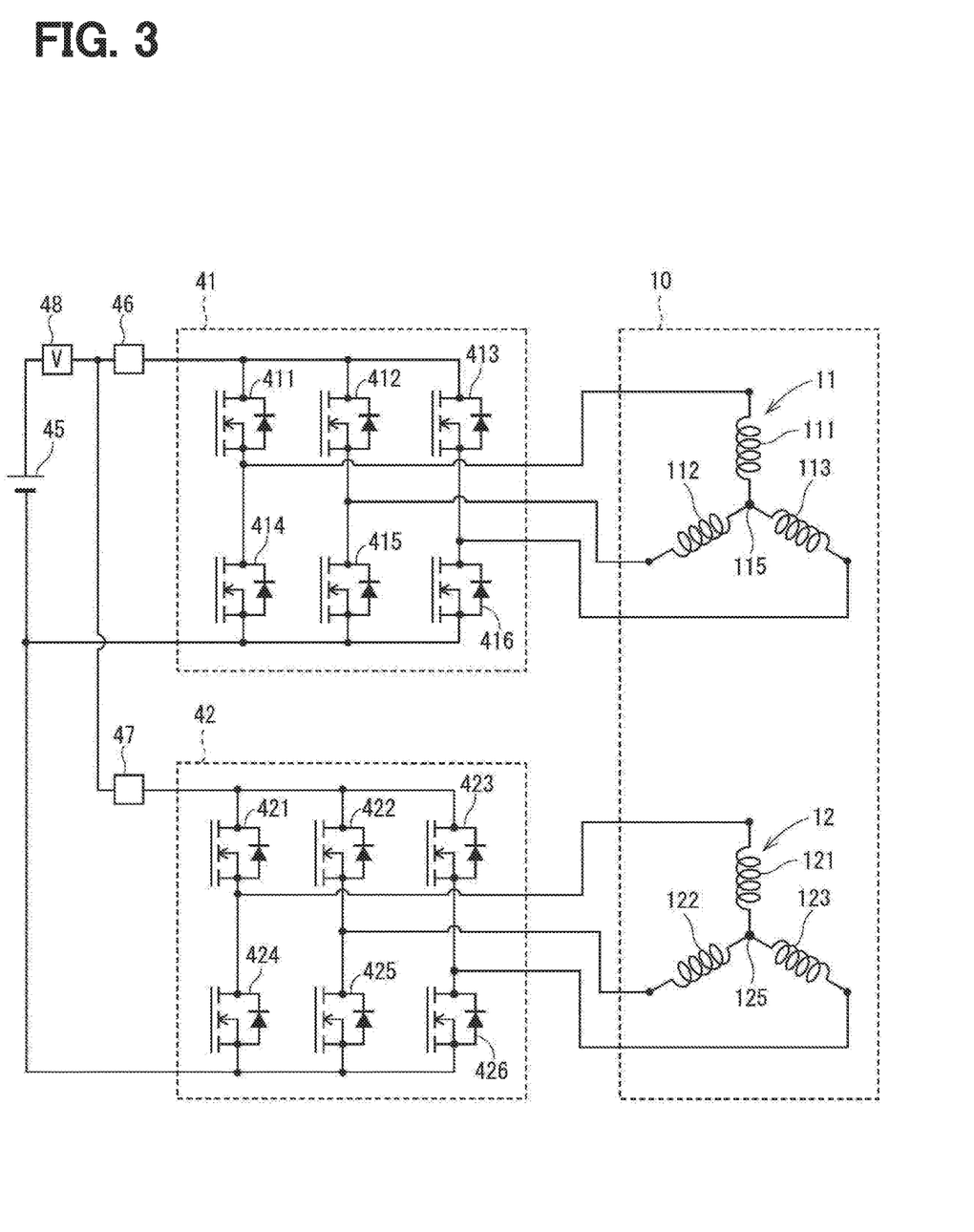
FIG. 3 is a circuit diagram showing a motor and a motor driver according to the embodiment.

The rotor 103 rotates by electric power being supplied from a battery 45 mounted in a vehicle (not shown) to winding sets 11, 12, and the motor 10 functions as a drive source for the shift range switching mechanism 20. The motor 10 of the present embodiment is a permanent magnet-type direct-current (DC) brushless motor. As shown in FIG. 3, the motor 10 has two winding sets 11, 12. A first winding set 11 has a U1 coil 111, a V1 coil 112, and a W1 coil 113. A second winding set 12 has a U2 coil 121, a V2 coil 122, and a W2 coil 123.

Figure 2:
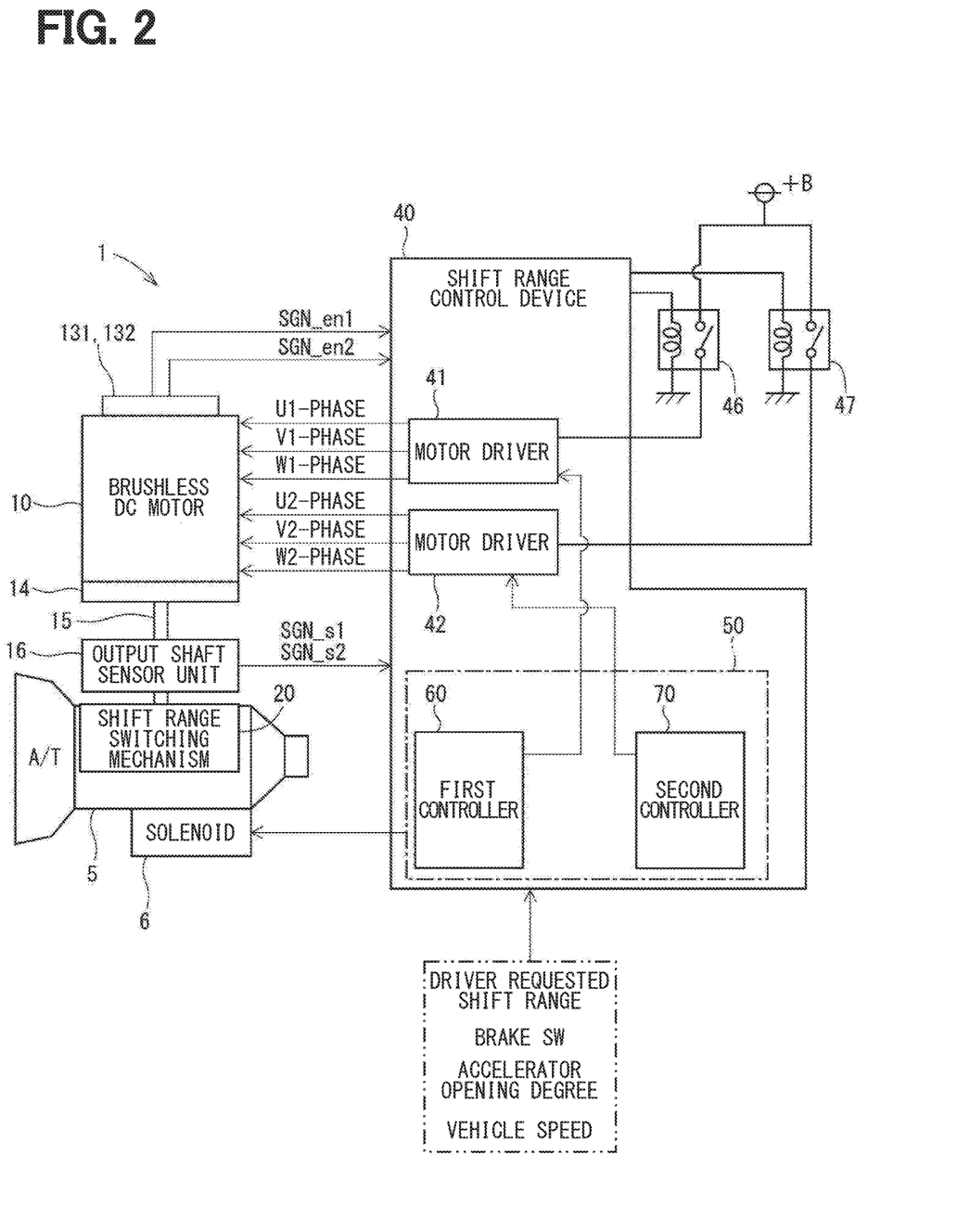
FIG. 2 is a schematic configuration diagram showing the shift-by-wire system according to the embodiment.
Figure 4:
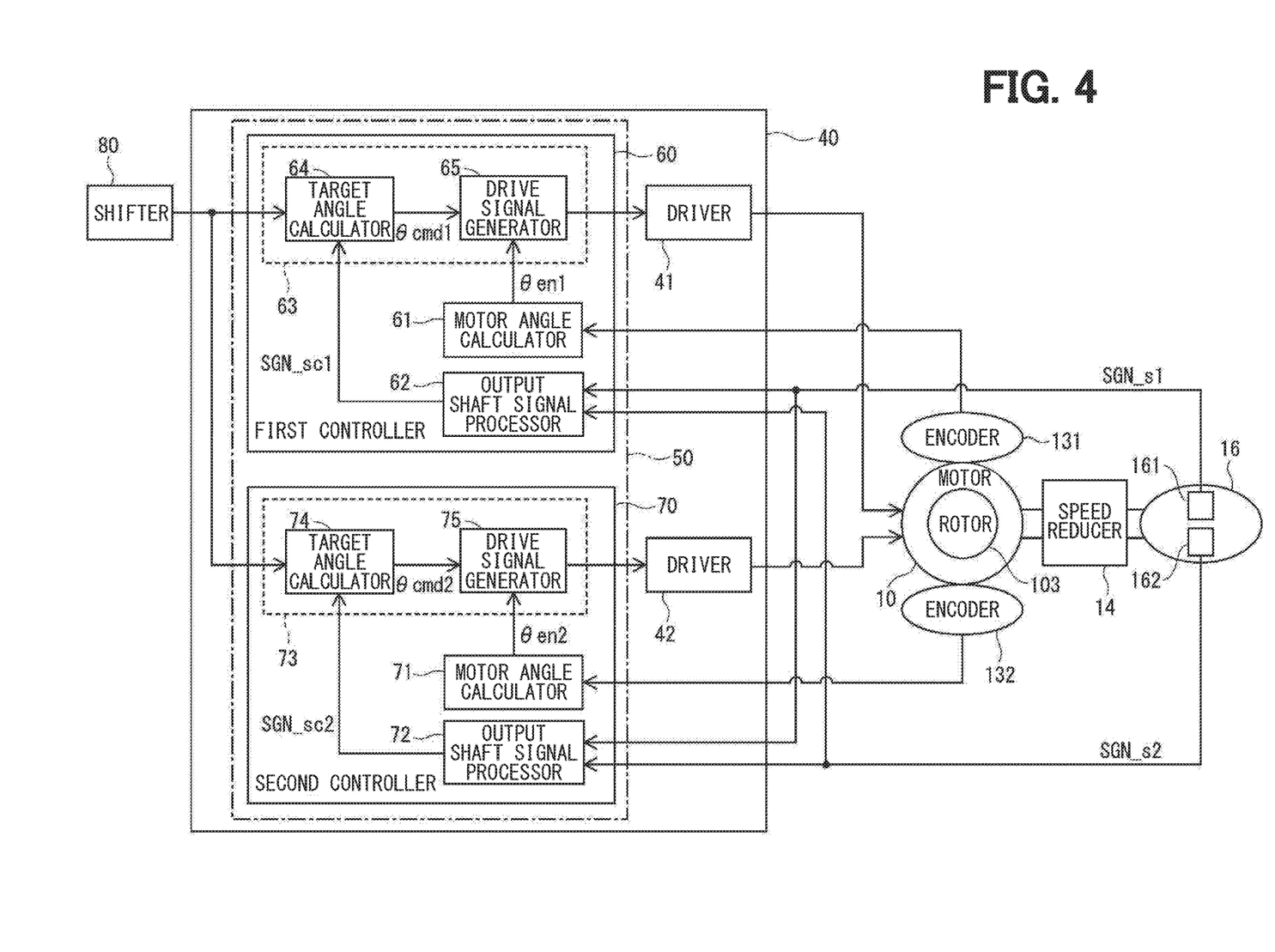
FIG. 4 is a block diagram showing a controller according to the embodiment.

As shown in FIGS. 2 and 4, a first encoder 131 and a second encoder 132 detect a rotational position of a rotor 103 of the motor 10. Each of the encoders 131, 132 is, for example, a magnet-type rotary encoder and is made up of a magnet that rotates integrally with the rotor 103, a magnetic detection hall integrated circuit (IC), and the like. The magnet may be shared by the encoders 131, 132. Each of the encoders 131, 132 is a three-phase encoder, and outputs A-phase, B-phase, and C-phase pulse signals at predetermined angles, respectively, in synchronization with the rotation of the rotor 103. In addition to the three-phase signals, a Z-phase signal as a reference signal may be output separately. The signal output from the first encoder 131 is referred to as a first encoder signal SGN_en1, and the signal output from the second encoder 132 is referred to as a second encoder signal SGN_en2.

A speed reducer 14 is provided between a motor shaft of the motor 10 and an output shaft 15, decelerates the rotation of the motor 10, and outputs the rotation to the output shaft 15. Thereby, the rotation of the motor 10 is transmitted to the shift range switching mechanism 20. The output shaft 15 is provided with an output shaft sensor unit 16 that detects the angle of the output shaft 15.

The output shaft sensor unit 16 has a first output shaft sensor 161 and a second output shaft sensor 162 as detection units. The first output shaft sensor 161 detects the rotational position of the output shaft 15 and outputs a first output shaft signal SGN_s1. The second output shaft sensor 162 detects the rotational position of the output shaft 15 and outputs a second output shaft signal SGN_s2. The output shaft sensors 161, 162 are, for example, potentiometers.

Figure 1:
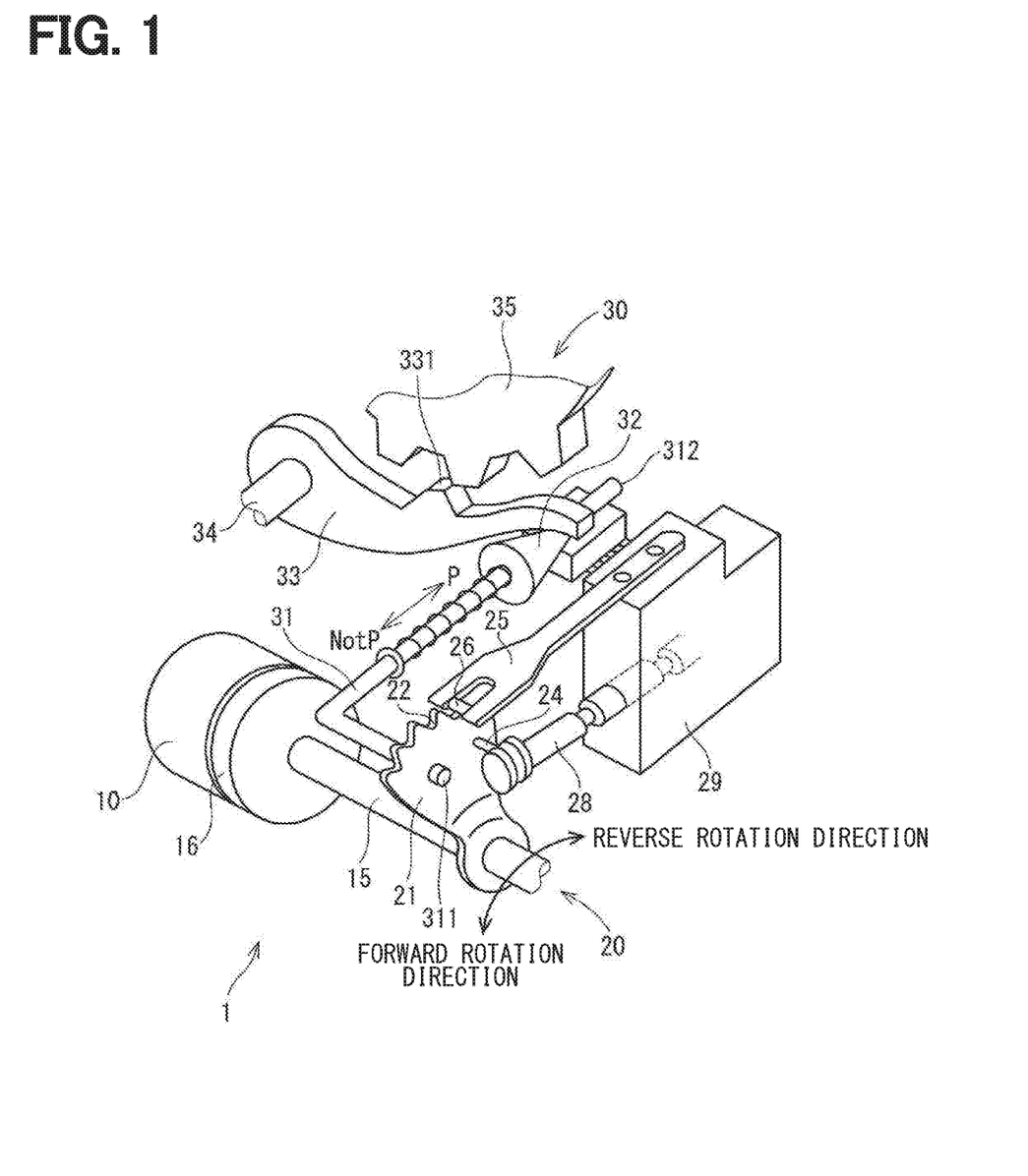
FIG. 1 is a perspective view showing a shift-by-wire system according to an embodiment.

As shown in FIG. 1, the shift range switching mechanism 20 includes a detent plate 21, a detent spring 25, and the like and transmits a rotational driving force, output from the speed reducer 14, to a manual valve 28 and the parking lock mechanism 30. The detent plate 21 is fixed to the output shaft 15 and driven by the motor 10. In the present embodiment, a direction in which the detent plate 21 is separated from a base of the detent spring 25 is defined as a forward rotation direction, and a direction in which the detent plate 21 approaches the base is defined as a reverse rotation direction.

The detent plate 21 is provided with a pin 24 that protrudes in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into linear motion and transmits the linear motion to the manual valve 28. The manual valve 28 is provided on a valve body 29. A hydraulic pressure supply path to a hydraulic clutch (not shown) is switched by the reciprocation of the manual valve 28 in the axial direction, and the shift range is changed by the switching of the engagement state of the hydraulic clutch.

The detent plate 21 has four concave portions 22 at portions adjacent to the detent spring 25. The concave portions 22 correspond to ranges of D (drive), N (neutral), R (reverse), and P (parking), respectively, from the base side of the detent spring 25. The concave portions 22 holds the manual valve 28 at positions corresponding to the respective ranges.

The detent spring 25 is an elastically deformable plate-like member, and a detent roller 26 is provided at the tip. The detent roller 26 is fitted into any one of the concave portions 22. The detent spring 25 energizes the detent roller 26 toward the revolving center side of the detent plate 21. When a rotational force equal to or more than a predetermined force is applied to the detent plate 21, the detent spring 25 is elastically deformed, and the detent roller 26 moves in the concave portions 22. By the detent roller 26 being fitted into any one of the concave portions 22, a swing of the detent plate 21 is restricted, and the axial position of the manual valve 28 and the state of the parking lock mechanism 30 are determined. Then, the shift range of an automatic transmission 5 is fixed.

The parking lock mechanism 30 includes a parking rod 31, a cone 32, a parking lock pole 33, a shaft portion 34, and a parking gear 35. The parking rod 31 is formed in a substantially L shape, and one end 311 is fixed to the detent plate 21. The cone 32 is provided at the other end 312 of the parking rod 31. The cone 32 is formed so as to decrease in diameter toward the other end 312. When the detent plate 21 swings in the reverse rotation direction, the cone 32 moves in a direction of arrow P.

The parking lock pole 33 is in contact with the conical surface of the cone 32 and is provided so as to be able to swing around the shaft portion 34. The parking lock pole 33 has a protrusion 331 that can be engaged with the parking gear 35. When the detent plate 21 rotates in the reverse rotation direction and the cone 32 moves in the direction of arrow P, the parking lock pole 33 is pushed up, and the protrusion 331 and the parking gear 35 engage with each other. On the other hand, when the detent plate 21 rotates in the forward rotation direction and the cone 32 moves in a direction of arrow not-P, the engagement between the protrusion 331 and the parking gear 35 is released.

The parking gear 35 is provided on an axle (not shown) and is provided so as to be able to engage with the protrusion 331 of the parking lock pole 33. When the parking gear 35 and the protrusion 331 engage with each other, the rotation of the axle is restricted. When the shift range is a not-P range that is a range except for P, the parking gear 35 is not locked by the parking lock pole 33, and the rotation of the axle is not hindered by the parking lock mechanism 30. When the shift range is a P range, the parking gear 35 is locked by the parking lock pole 33, and the rotation of the axle is restricted.

As shown in FIGS. 2 and 4, the shift range control device 40 includes motor drivers 41, 42, an ECU 50, and the like. The motor driver 41 is a three-phase inverter that switches the current supply to the first winding set 11, and switching elements 411 to 416 are bridge-connected. One end of the U1 coil 111 is connected to a connection point of a pair of U-phase switching elements 411, 414. One end of the V1 coil 112 is connected to a connection point between the V-phase switching elements 412, 415 that form a pair. One end of the W1 coil 113 is connected to a connection point of a pair of W-phase switching elements 413, 416. The other ends of the coils 111 to 113 are connected at a connection portion 115.

The motor driver 42 is a three-phase inverter that switches the current supply to the second winding set 12, and the switching elements 421 to 426 are bridge-connected. One end of the U2 coil 121 is connected to a connection point of a pair of U-phase switching elements 421, 424. One end of the V2 coil 122 is connected to a connection point of a pair of the V-phase switching elements 422, 425. One end of the W2 coil 123 is connected to a connection point of a pair of W-phase switching elements 423, 426. The other ends of the coils 121 to 123 are connected at a connection portion 125. The switching elements 411 to 416 and 421 to 426 of the present embodiment are MOSFETs, but other elements such as insulated gate bipolar transistors (IGBTs) may be used.

A motor relay 46 is provided between the motor driver 41 and the battery 45. A motor relay 47 is provided between the motor driver 42 and the battery 45. The motor relays 46, 47 are turned on when a start switch such as an ignition switch is on, and electric power is supplied to the motor 10. By turning off the motor relays 46 and 47, the electric power supply to the motor 10 is stopped. On the high potential side of the battery 45, a voltage sensor 48 for detecting a battery voltage is provided.

The ECU 50 has a first controller 60 and a second controller 70. Each of the first controller 60 and the second controller 70 is made up mainly of a microcomputer or the like and internally includes a central processing unit (CPU), a read-only memory (ROM), a random-access memory (RAM), an input/output (I/O) (not shown), a bus line that connects these constituents, and the like. Each processing in the ECU 50 may be software processing performed by the CPU executing a program stored in advance in a tangible memory device (i.e., a readable non-transitory tangible recording medium) such as a ROM, or may be hardware processing performed by a dedicated electronic circuit. The ECU 50 controls the switching of the shift range by controlling the drive of the motor 10 based on a shift signal corresponding to a driver requested shift range which is acquired from a shifter 80, a signal from a brake switch, a vehicle speed, and the like. Further, the ECU 50 controls the drive of a transmission hydraulic control solenoid 6 based on the vehicle speed, an accelerator opening degree, a driver requested shift range, and the like. A gear stage is controlled by controlling the transmission hydraulic control solenoid 6. The transmission hydraulic control solenoids 6 are provided in number in accordance with the number of gear stages, or the like. In the present embodiment, one ECU 50 controls the drive of the motor 10 and the solenoid 6, but a motor ECU for controlling the motor 10 and an automatic transmission (AT)-ECU for controlling the solenoid may be separated. Hereinafter, the drive control for the motor 10 will be mainly described.

As shown in FIG. 4, the first controller 60 acquires the first encoder signal SGN_en1 output from the first encoder 131. The second controller 70 acquires the second encoder signal SGN_en2 output from the second encoder 132. Further, the first controller 60 and the second controller 70 acquire the output shaft signals SGN_s1, SGN_s2 from the output shaft sensor unit 16. That is, in the present embodiment, the encoder signals SGN_en1, SGN_en2 are acquired for the respective systems and are not cross-input. On the other hand, the output shaft signals SGN_s1, SGN_s2 are cross-input to each system.

The first controller 60 includes a motor angle calculator 61, an output shaft signal processor 62, a drive controller 63, and the like. The second controller 70 includes a motor angle calculator 71, an output shaft signal processor 72, a drive controller 73, and the like. Since the control by the second controller 70 is the same except that the encoder signal SGN_en2 is used in place of the encoder signal SGN_en1, the processing in the first controller 60 will be mainly described below, and the description of the second controller 70 will be omitted as appropriate.

The motor angle calculator 61 acquires the first encoder signal SGN_en1 from the first encoder 131 and calculates an encoder count value θen1. Specifically, the motor angle calculator 61 counts up or down the encoder count value θen1 in accordance with the signal pattern for each of pulse edges of the A-phase, B-phase, and C-phase signals included in the encoder signal SGN_en1. The motor angle calculator 71 calculates an encoder count value θen2 based on the second encoder signal SGN_en2 from the second encoder 132.

The output shaft signal processor 62 acquires the output shaft signals SGN_s1, SGN_s2 from the output shaft sensor unit 16 and determines the calculation output shaft signal SGN_sc1. The output shaft signal processor 72 acquires the output shaft signals SGN_s1, SGN_s2 from the output shaft sensor unit 16 and determines the calculation output shaft signal SGN_sc2. The Details of the determination of the calculation output shaft signals SGN_sc1, SGN_sc2 will be described later.

The drive controller 63 has a target angle calculator 64 and a drive signal generator 65. The drive controller 73 has a target angle calculator 74 and a drive signal generator 75. The target angle calculator 64 calculates a target count value θcmd1 for stopping the motor 10 based on the target shift range and the calculation output shaft signal SGN_sc1. The target angle calculator 74 calculates a target count value θcmd2 for stopping the motor 10 based on the target shift range and the calculation output shaft signal SGN_sc2.

The drive signal generator 65 generates a drive signal for turning on and off the switching elements 411 to 416 by feedback control or the like so that the encoder count value θen1 becomes the target count value θcmd1. Thereby, the current supply to the first winding set 11 is controlled. The drive signal generator 75 generates a drive signal for controlling the on-off operation of the switching elements 421 to 426 by feedback control or the like so that the encoder count value θen2 becomes the target count value θcmd2. Thereby, the current supply to the second winding set 12 is controlled. The drive controllers 63, 73 control the drive of the motor 10 by controlling the current supply to the winding sets 11, 12. That is, in the present embodiment, the drive of the motor 10, which is one actuator, is controlled by the two controllers 60, 70. The detail of the drive control for the motor 10 may be anything.

In the present embodiment, a combination of the first winding set 11 and the first encoder 131, the driver 41, and the first controller 60 that are related to the current-supply control of the first winding set 11 is defined as a first system. A combination of the second winding set 12 and the second encoder 132, the driver 42, and the second controller 70 that are related to the current-supply control of the second winding set 12 is defined as a second system. Further, in the present embodiment, two each of configurations related to the current-supply control of the motor 10 are provided, and the drive of the motor 10 is controlled by complete double-system parallel control.

Figure 5:
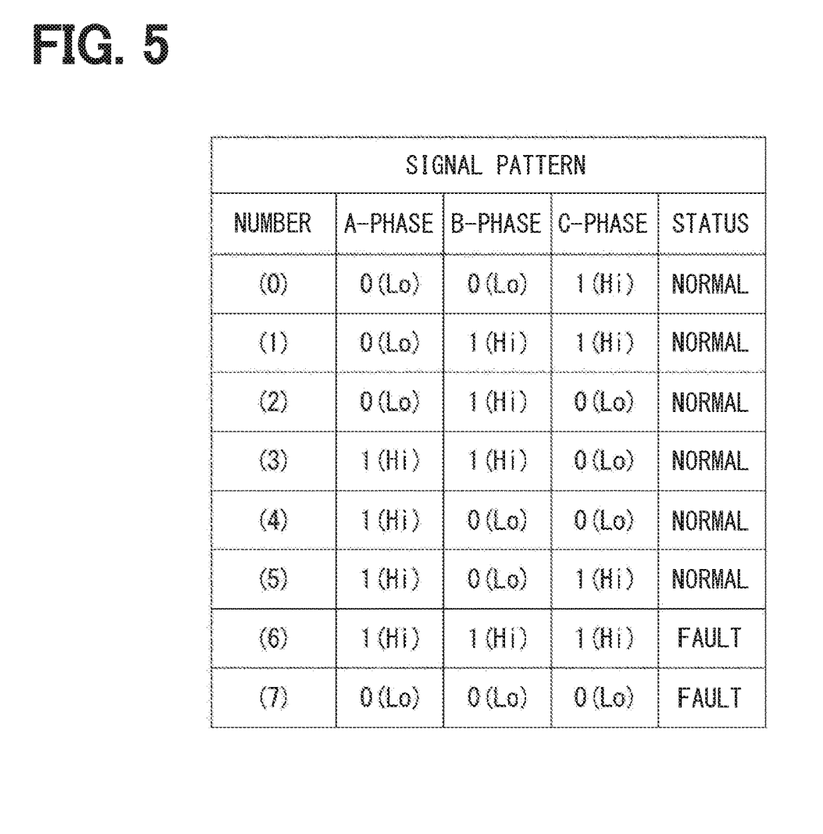
FIG. 5 is a diagram showing encoder patterns according to the embodiment.

FIG. 5 shows signal patterns of the encoder signals SGN_en1, SGN_en2. In FIG. 5, numbers (0) to (7) are pattern numbers indicating signal patterns. In the drawing, a state where the signal of each phase is Lo is described as "0 (Lo)", and a state where the signal is Hi is described as "1 (Hi)".

A signal pattern in which the A-phase signal and the B-phase signal are Lo and the C-phase signal is Hi is defined as a pattern (0). A signal pattern in which the A-phase signal is Lo and the B-phase signal and the C-phase signal are Hi is defined as a pattern (1). A signal pattern in which the A-phase signal and the C-phase signal are Lo and the B-phase signal is Hi is defined as a pattern (2). A signal pattern in which the A-phase signal and the B-phase signal are Hi and the C-phase signal is Lo is defined as a pattern (3). A signal pattern in which the A-phase signal is Hi and the B-phase signal and the C-phase signal are Lo is defined as a pattern (4). A signal pattern in which the A-phase signal and the C-phase signal are Hi and the B-phase signal is Lo is defined as a pattern (5).

The patterns (0) to (5) are normal patterns, and at the time of rotating the motor 10, the current-supplied phase is switched in accordance with the signal pattern at every edge interrupt of each of a rotational angle signal from the encoders 131, 132. In the case of a three-phase encoder system, the current-supplied phase is uniquely determined for the signal pattern.

A signal pattern in which the A-phase signal, the B-phase signal, and the C-phase signal are all Hi is defined as a pattern (6), and a signal pattern in which the A-phase signal, the B-phase signal, and the C-phase signal are all Lo is defined as a pattern (7). The pattern (6) in which the A-phase signal, the B-phase signal, and the C-phase signal are all Hi and the pattern (7) in which the phase signals are all Lo are fault patterns that do not occur in a normal state.

Figure 6:
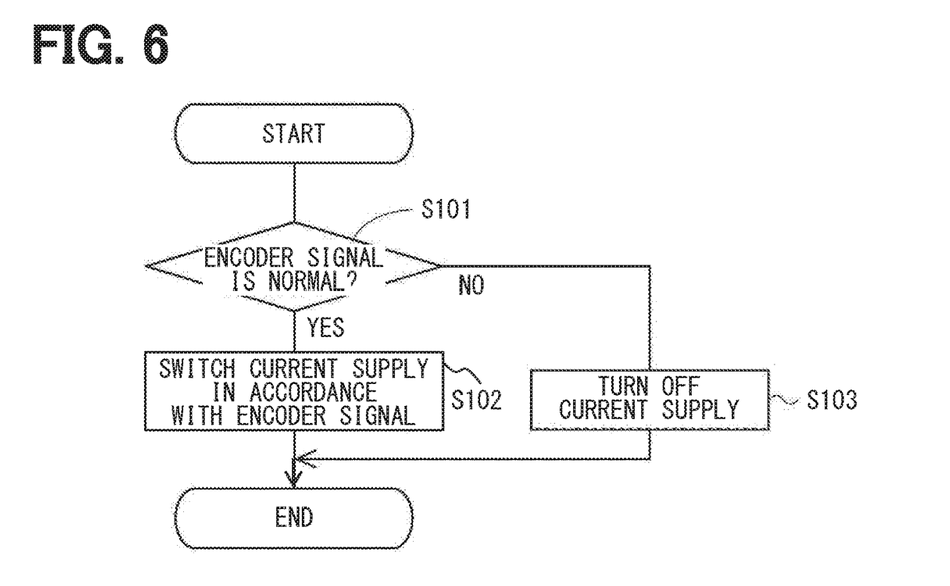
FIG. 6 is a flowchart for explaining a current-supply switching processing according to the embodiment.

A current-supply switch processing in the drive signal generators 65, 75 will be described based on the flowchart shown in FIG. 6. This processing is performed by the controllers 60, 70 in interrupt processing at the time of detecting the edges of the encoder signals SGN_en1, SGN_en2. Here, the processing in the first controller 60 will be described.

In S101, the motor angle calculator 61 determines whether the encoder signal SGN_en1 is normal. When the signal pattern is one of the patterns (1) to (5), the motor angle calculator 61 determines that the signal pattern is the normal pattern. When the signal pattern is one of the patterns (6) and (7), the motor angle calculator 61 determines that the signal pattern is the fault pattern. When it is determined that the encoder signal SGN_en1 is normal (S101: YES), the processing proceeds to S102. When it is determined that the encoder signal SGN_en1 is in fault (S101: NO), the processing proceeds to S103.

In S102, the drive signal generator 65 switches the current-supplied phase in accordance with the signal pattern of the encoder signal SGN_en1 and controls the current supply to the first winding set 11 so that the encoder count value θen1 becomes the target count value θcmd1. In S103, the motor relay 46 and the switching elements 411 to 416 are turned off, and the current supply to the first winding set 11 is stopped. At this time, when the encoder signal SGN_en2 is normal, the drive control for the motor 10 is continued using the second system.

In the present embodiment, since the configuration related to the drive of the motor 10 has been duplexed, the encoder signals SGN_en1, SGN_en2 do not always need to be used, and even when a fault has occurred in one system, the drive of the motor 10 can be continued using the other system, so that the switching of the shift range can be continued.

Figure 7:
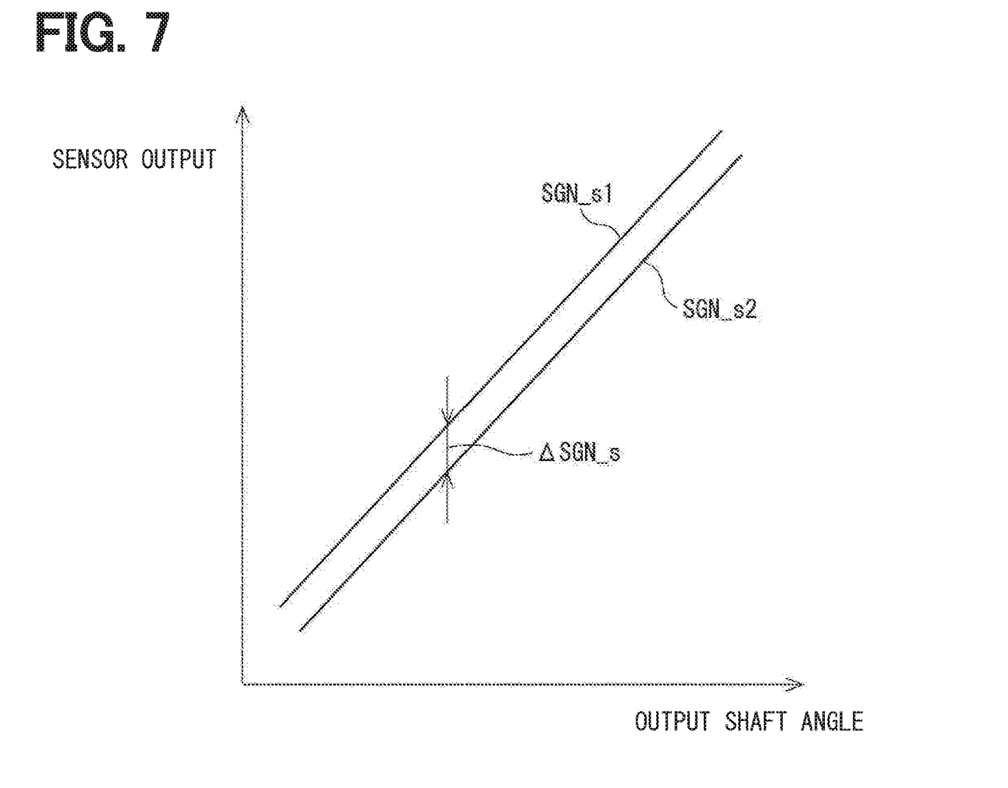
FIG. 7 is an explanatory diagram showing an output shaft signal according to the embodiment.

In FIG. 7, the horizontal axis represents an output shaft angle, and the vertical axis represents a sensor output from each of the output shaft sensors 161, 162. As shown in FIG. 7, in the output shaft signals SGN_s1, SGN_s2, detection errors might occur due to electric noise, misalignment of the sensor, or the like. In the present embodiment, the target angle calculators 64, 74 set target count values θcmd1, θcmd2 by using the values acquired from the output shaft sensor unit 16.

Figure 8:
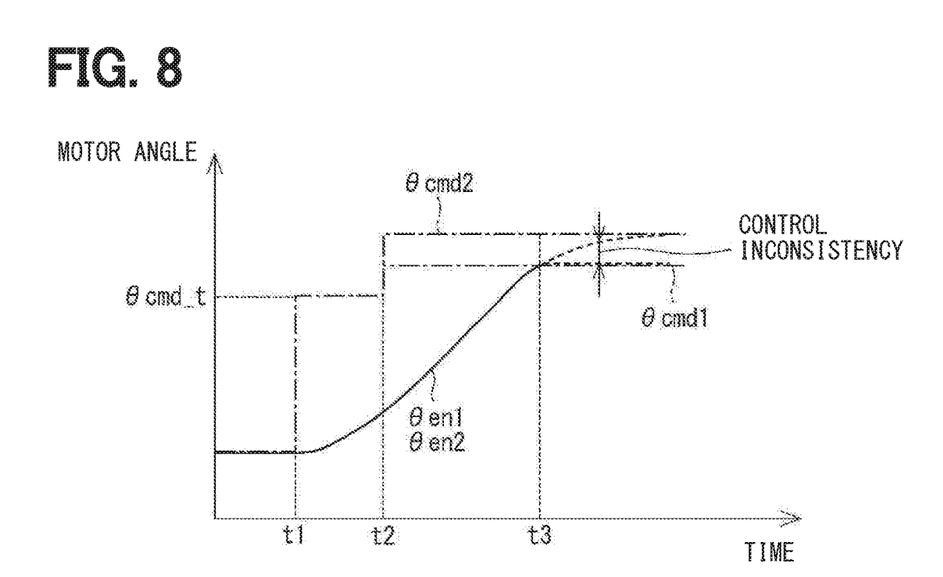
FIG. 8 is a time chart for explaining control inconsistency due to a deviation of target count values.

FIG. 8 shows a reference example in which the target angle calculator 64 sets the target count value θcmd_1 by using the output shaft signal SGN_s1, and the target angle calculator 74 sets the target count value θcmd_2 by using the output shaft signal SGN_s2.

In FIG. 8, the horizontal axis represents time, and the vertical axis represents a motor angle. The motor angle is indicated by the number of counts of the encoders 131, 132. As shown in FIG. 8, at time t1, the target shift range is switched, and the drive of the motor 10 is started with the target count value θcmd as a temporary target value θcmd_t. At time t2, in a case where the target angle calculator 64 sets the target count value θcmd1 based on the output shaft signal SGN_s1 and the target angle calculator 74 sets the target count value θcmd2 based on the output shaft signal SGN_s2, when the values of the output shaft signals SGN_s1, SGN_s2 are different, the target count values θcmd1, θcmd2 have different values.

At time t3, when the encoder count value θen1 has reached the target count value θcmd1 and the encoder count value θen2 has not reached the target count value θcmd_2, control inconsistency occurs in such a manner that the motor 10 is attempted to be stopped in the first system while the motor 10 is attempted to be rotated in the second system, and there is a possibility that controllability such as hunting deteriorates and a drive loss occurs. In FIG. 8, for the sake of simplicity, the description has been made assuming that the target count values θcmd1, θcmd2 are corrected once.

However, the number of corrections may be two or more, and the same applies even when the correction is continuously performed in accordance with the changes of the output shaft signals SGN_s1, SGN_s2.

Therefore, in the present embodiment, the target angle calculators 64, 74 calculate the target count value θcmd by using either one of the output shaft signals SGN_s1, SGN_s2. In the present embodiment, when the first output shaft signal SGN_s1 is normal, the first output shaft signal SGN_s1 is used preferentially.

Figure 9:
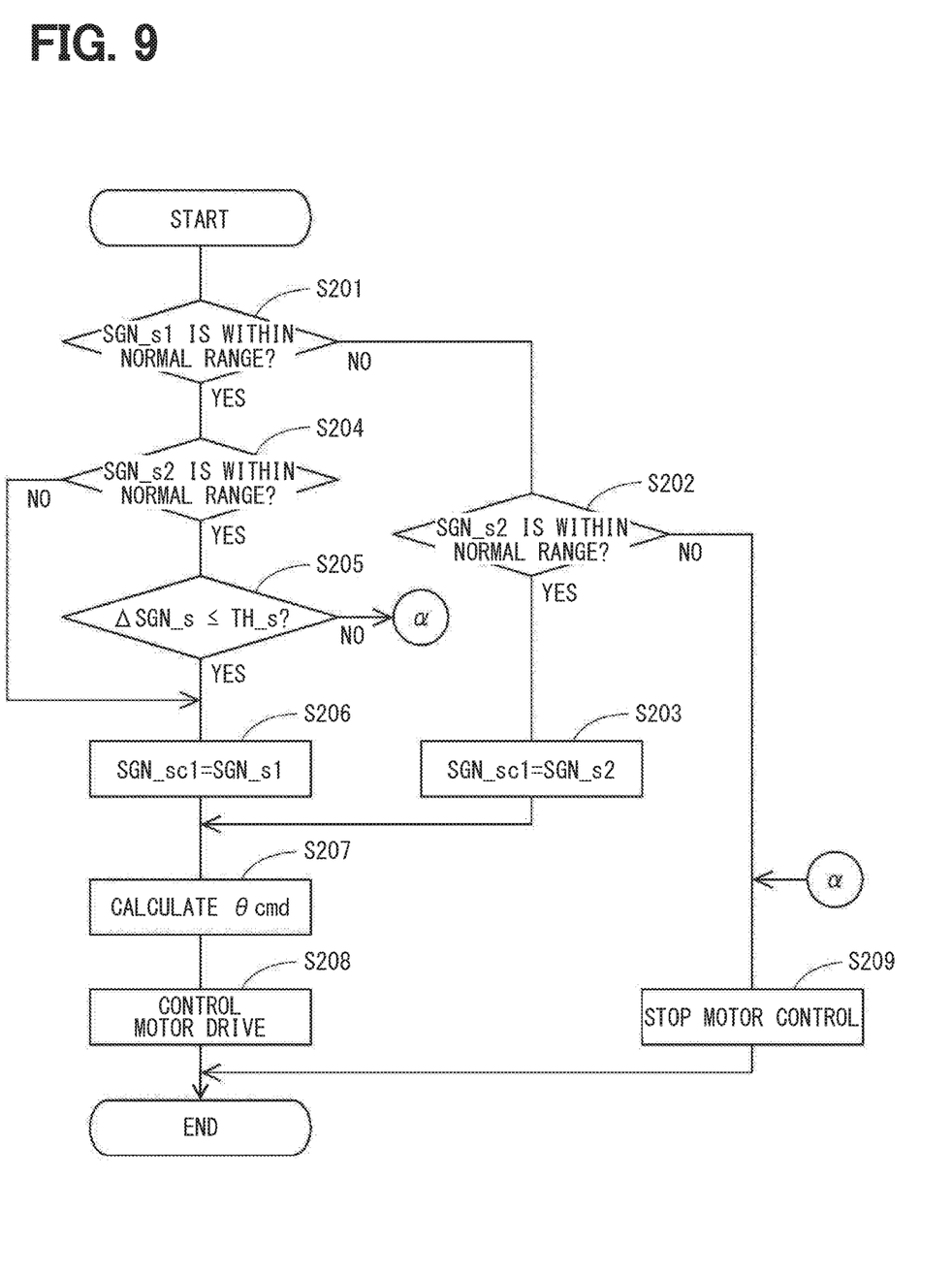
FIG. 9 is a flowchart for explaining a target angle calculation processing according to the embodiment.

A target angle calculation processing will be described based on a flowchart of FIG. 9. This processing is performed by the controllers 60, 70 at a predetermined cycle. In S201, the output shaft signal processor 62 determines whether the first output shaft signal SGN_s1 is within a normal range. When the first output shaft signal SGN_s1 is equal to or more than the lower limit determination threshold TH_L and equal to or less than the upper limit determination threshold TH_H, it is determined that the first output shaft signal SGN_s1 is within the normal range. When it is determined that the first output shaft signal SGN_s1 is within the normal range (S201: YES), the processing proceeds to S204. When it is determined that the first output shaft signal SGN_s1 is out of the normal range (S201: NO), the processing proceeds to S202.

In S202, the output shaft signal processor 62 determines whether the second output shaft signal SGN_s2 is within the normal range. The detail of the determination is the same as that of the determination related to the first output shaft signal SGN_s1. When it is determined that the second output shaft signal SGN_s2 is within the normal range (S202: YES), the processing proceeds to S203, and the calculation output shaft signal SGN_sc1 is set as the second output shaft signal SGN_s2. When it is determined that the second output shaft signal SGN_s2 is out of the normal range (S201: NO), the processing proceeds to S209.

In S204 to which the processing proceeds when it is determined that the first output shaft signal SGN_s1 is within the normal range (S201: YES), the output shaft signal processor 62 determines whether the second output shaft signal SGN_s2 is within the normal range as in S202. When it is determined that the second output shaft signal SGN_s2 is within the normal range (S204: YES), the processing proceeds to S205. When it is determined that the second output shaft signal SGN_s2 is out of the normal range (S204: NO), the processing proceeds to S206, and the calculation output shaft signal SGN_sc1 is set as the first output shaft signal SGN_s1.

In S205, the output shaft signal processor 62 determines whether an output shaft signal deviation ΔSGN_s, which is the absolute value of the difference between the first output shaft signal SGN_s1 and the second output shaft signal SGN_s2, is equal to or less than an error determination threshold TH_s. When it is determined that the output shaft signal deviation ΔSGN_s is more than the error determination threshold TH_s (S205: NO), the processing proceeds to S209. When it is determined that the output shaft signal deviation ΔSGN_s is equal to or less than the error determination threshold TH_s (S205: YES), the processing proceeds to S206, and the calculation output shaft signal SGN_sc1 is set as the first output shaft signal SGN_s1.

In S207, the target angle calculator 64 calculates the target count value θcmd1 by using the calculation output shaft signal SGN_sc1. In S208, the drive signal generator 65 controls the drive of the motor 10 by using the target count value θcmd1.

In S209 to which the processing proceeds when both the output shaft signals SGN_s1, SGN_s2 are out of the normal range (S201: NO and S202: NO), or when it is determined that the output shaft signal deviation ΔSGN_s is more than the error determination threshold TH_s (S205: NO), the controller 60 stops the drive control for the motor 10.

In the second controller 70, similar processing is performed, and when both the output shaft signals SGN_s1, SGN_s2 are within the normal range and the output shaft signal deviation ΔSGN_s is equal to or less than the error determination threshold TH_s, the calculation output shaft signal SGN_sc2 is set as the first output shaft signal SGN_s1. When the first output shaft signal SGN_s1 is within the normal range and the second output shaft signal SGN_s2 is outside the normal range, the calculation output shaft signal SGN_sc2 is set as the first output shaft signal SGN_s1. When the first output shaft signal SGN_s1 is outside the normal range and the second output shaft signal SGN_s2 is within the normal range, the calculation output shaft signal SGN_sc2 is set as the second output shaft signal SGN_s2. As a result, the calculation output shaft signals SGN_sc1, SGN_sc2 have the same value. In the target angle calculators 64, 74, the target count values θcmd1, θcmd2 are calculated using the same value. Therefore, with the target count values θcmd1, θcmd2 having the same value, the control inconsistency due to an error of the target count values θcmd1, θcmd2 between the systems can be prevented.

As described above, in the shift-by-wire system 1 provided with a motor 10 having a plurality of winding sets 11, 12, and a plurality of detection units each of which detects a physical quantity that changes in accordance with the rotation of the motor 10, the shift range control device 40 of the present embodiment includes a plurality of controllers 60, 70 that are provided corresponding to the winding sets 11, 12 and control the switching of the shift range by controlling the drive of the motor 10. The detection units of the present embodiment are output shaft sensors 161, 162 that detect the rotational position of the output shaft 15 to which the drive of the motor 10 is transmitted and output the output shaft signals SGN_s1, SGN_s2 as detection signals.

The controllers 60, 70 include signal processors 62, 72 and drive controllers 63, 73. The signal processors 62, 72 acquire the output shaft signals SGN_s1, SGN_s2 from the plurality of output shaft sensors 161, 162, and based on the acquired output shaft signals SGN_s1, SGN_s2, the signal processors 62, 72 determine the calculation output shaft signals SGN_sc1, SGN_sc2 having the same value between the plurality of controllers 60, 70. The drive controllers 63, 73 control the current supply to the winding sets 11, 12 provided corresponding to the controllers 60, 70 based on the target shift range and the calculation output shaft signals SGN_sc1, SGN_sc2.

In the present embodiment, since the configuration related to the drive control for the motor 10 has been multiplexed, even when a fault had occurred partially, the drive control for the motor 10 can be continued and the shift range can be switched. Hence it is possible to ensure evacuation traveling performance. Further, since the calculation output shaft signals SGN_sc1, SGN_sc2 having the same value between all the controllers 60, 70 are used for the current-supply control, it is possible to avoid control inconsistency due to an error of the plurality of output shaft signals SGN_s1, SGN_s2. Therefore, the deterioration in controllability due to control inconsistency can be prevented, and the control loss can be reduced, so that the motor 10 can be driven with high efficiency.

The shift-by-wire system 1 includes a plurality of encoders 131, 132. The encoders 131, 132 are provided for the respective controllers 60, 70. The first encoder 131 detects the rotational position of the rotor 103 of the motor 10 and outputs the encoder signal SGN_en1 to the first controller 60 provided corresponding to the first encoder 131. The second encoder 132 detects the rotational position of the rotor 103 of the motor 10 and outputs the encoder signal SGN_en2 to the second controller 70 provided corresponding to the second encoder 132.

The drive controllers 63, 73 calculate the target count values θcmd1, θcmd2 based on the calculation output shaft signals SGN_sc1, SGN_sc2, which are the calculation signals having the same value in the plurality of controllers 60, 70, respectively. The drive controllers 63, 73 then controls the drive of the motor 10 so that the encoder count values θen1, θen2 based on the encoder signals SGN_en1, SGN_en2, individually acquired by the respective controllers 60, 70, become the target count values θcmd1, θcmd2. Thereby, the target count values θcmd1, θcmd2 match in the controllers 60, 70, so that the control inconsistency can be prevented.

In the present embodiment, the output shaft signals SGN_s1, SGN_s2 are updated on the order of several ms, whereas the encoder signals SGN_en1, SGN_en2 are updated on the order of several hundred μs because being calculated by an interrupt. That is, the encoder signals SGN_en1, SGN_en2 are updated more frequently than the output shaft signals SGN_s1, SGN_s2. For this reason, errors in the encoder signals SGN_en1, SGN_en2 are small, and even when an individual value is used for each system, a little influence is exerted on controllability. Thus, even when the encoder signals SGN_en1, SGN_en2 cannot be cross-input, the drive of the motor 10 can be controlled appropriately.

When the first encoder signal SGN_en1 is in fault, the first controller 60 having acquired the first encoder signal SGN_en1 being in fault stops the current supply to the corresponding first winding set 11, and the second controller 70 as the other controller continues the drive control of the motor 10. When the second encoder signal SGN_en2 is in fault, the second controller 70 having acquired the second encoder signal SGN_en2 being in fault stops the current supply to the corresponding second winding set 12, and the first controller 60 as the other controller continues the drive control of the motor 10.

By stopping the current supply to the winding set of the fault system, the generation of the retarding torque by the fault system can be prevented, and the motor 10 can be appropriately rotated in the normal system. Therefore, even when one of the encoder signals SG_en1 and SGN_en2 is in fault, the range switching can be continued, and the evacuation traveling performance can be ensured.

In the present embodiment, the shift-by-wire system 1 corresponds to a "shift range switching system", the output shaft sensors 161, 162 correspond to "detection units", the output shaft signals SGN_s1, SGN_s2 correspond to "detection signals", and the calculation output shaft signals SGN_sc1, SGN_sc2 correspond to "calculation signals". Since the output shaft sensors 161, 162 of the present embodiment are potentiometers, a resistance value of a variable resistor that changes in accordance with the rotation of the motor 10 corresponds to "a physical quantity that changes in accordance with rotation of the motor". When the output shaft sensors 161, 162 to be used are magnetic sensors, "a physical quantity that changes in accordance with rotation of the motor" are such as the magnitude or direction of a magnetic field, depending on the type of the output shaft sensors 161, 162.

Further, the encoders 131, 132 correspond to "motor rotational angle sensors", the encoder signals SGN_en1, SGN_en2 correspond to "motor rotational angle signals", the encoder count values θen1, θen2 correspond to "motor rotational angles", and the target count values θcmd1, θcmd2 correspond to "target rotational angles".

OTHER EMBODIMENTS

In the above embodiment, the plurality of output shaft signals SGN_s1, SGN_s2 are both input to the controllers 60, 70, respectively. On the other hand, the first encoder signal SGN_en1 is input to the first controller 60, the second encoder signal SGN_en2 is input to the second controller 70, the first encoder signal SGN_en1 is not input to the second controller 70, and the second encoder signal SNG_en2 is not input to the first controller 60. In another embodiment, similarly to the output shaft signals SGN_s1, SGN_s2, both the encoder signals SGN_en1, SGN_en2 may also be input to the controllers 60, 70, respectively. For further reducing the control inconsistency, the same value of the motor rotational angle signal may also be used for all the controllers. That is, the encoders 131, 132 as the motor rotational angle sensors may be regarded as "detection units", and the encoder signals SGN_en1, SGN_en2 as the motor rotational angle signals may be regarded as "detection signals". Other sensors or the like with detection values changing in accordance with the rotation of the motor may be used as the detection units.

In the above embodiment, one of the detection signals is selected as the calculation signal. In another embodiment, a calculation value such as an average value calculated using a normal detection signal may be used as the calculation signal.

In the above embodiment, two each of controllers, encoders, output shaft sensors, and winding sets are provided, and the configuration related to the motor drive control has been duplexed. In another embodiment, three each of controllers, encoders, output shaft sensors, and winding sets may be provided to multiplex the configuration.

In the above embodiment, the motor rotational angle sensor is the three-phase encoder. In another embodiment, the motor rotational angle sensor may be a two-phase encoder, or is not limited to the encoder, and any other devices such as a resolver may be used. In the above embodiment, the output shaft sensor is the potentiometer. In another embodiment, the output shaft sensor may be a magnetic sensor, is not limited to one in which a value changes continuously, and may be one in which a value changes stepwise. The output shaft sensor may be configured by a switch that is turned on and off in an angle range corresponding to each range.

In the above embodiment, the motor is the permanent magnet-type three-phase brushless motor. In another embodiment, any motor may be used, such as a switched reluctance (SR) motor. In the above embodiment, the detent plate is provided with four concave portions. In another embodiment, the number of concave portions is not limited to four but may be any number. For example, the number of concave portions in the detent plate may be two, and the P range and the not-P range may be switched. Further, the shift range switching mechanism, the parking lock mechanism, and the like may be different from those in the above embodiment. As mentioned above, the present disclosure is not limited to the above embodiments but can be implemented in various forms in the scope not deviating from its gist.

The controller and the technique according to the present disclosure may be achieved by a dedicated computer provided by constituting a processor and a memory programmed to execute one or more functions embodied by a computer program. Alternatively, the controller and the technique according to the present disclosure may be achieved by a dedicated computer provided by constituting a processor with one or more dedicated hardware logic circuits. Alternatively, the controller and the technique according to the present disclosure may be achieved using one or more dedicated computers constituted by a combination of the processor and the memory programmed to execute one or more functions and the processor with one or more hardware logic circuits. Further, the computer program may store a computer-readable non-transitional tangible recording medium as an instruction to be executed by the computer.

What is claimed is:

1. A shift range control device for a shift range switching system that includes:
   a motor having a plurality of winding sets;
   an output shaft sensor including a plurality of detectors, each of the detectors configured to detect a physical quantity that changes in accordance with rotation of the motor, the output shift sensor configured to detect a rotational position of an output shaft to which drive of the motor is transmitted and output an output shaft signal as a detection signal; and a plurality of motor rotational angle sensors each of which is configured to detect a rotational position of a rotor of the motor and output a motor rotational angle signal, the shift range control device comprising:

a plurality of controllers configured to control switching of a shift range by controlling drive of the motor, wherein each of the controllers is provided to corresponding one of the winding sets, and each of the controllers includes:

a signal processor configured to acquire the output shaft signals from the detectors and determine, based on the output shaft signals, a calculation signal having a same value between the controllers; and a drive controller configured to calculate a target rotational angle based on a target shift range and the calculation signal, and control a current supply to the corresponding one of the winding sets to make a motor rotational angle based the motor rotational angle signal individually acquired by each of the controllers from a corresponding one of the motor rotational angle sensors become target rotational angle.

2. The shift range control device according to claim 1, wherein when one of the motor rotational angle signals is in fault, one of the controllers having acquired the motor rotational angle signal being in fault stops the current supply to the corresponding one of the winding sets, and the other controller continues to control the drive of the motor.

3. A shift range control device for a shift range switching system that includes:

a motor having a plurality of winding sets;

an output shaft sensor including a plurality of detectors, each of the detectors configured to detect a physical quantity that changes in accordance with rotation of the motor, the output shaft sensor configured to detect a rotational position of an output shaft to which drive of the motor is transmitted and output an output shaft signal as a detection signal; and a plurality of motor rotational angle sensors each of which is configured to detect a rotational position of a rotor of the motor and output a motor rotational angle signal, the shift range control device comprising:

a plurality of controllers configured to control switching of a shift range by controlling drive of the motor, wherein each of the controllers is provided to corresponding one of the winding sets, each of the controllers includes a processor and a memory, and the memory storing instructions configured to, when executed by the processor, cause the processor to:

acquire the output shaft signals from the detectors and determine, based on the output shaft signals, a calculation signal having a same value between the controllers; and calculate a target rotational angle based on a target shift range and the calculation signal, and control a current supply to the corresponding one of the winding sets to make a motor rotational angle based the motor rotational angle signal individually acquired by each of the controllers from a corresponding one of the motor rotational angle sensors become the target rotational angle.

* * * * *